(12) United States Patent
Bauer et al.

(10) Patent No.: US 10,759,341 B2
(45) Date of Patent: *Sep. 1, 2020

(54) MOTOR VEHICLE

(71) Applicant: Bayerische Motoren Werke Aktiengesellschaft, Munich (DE)

(72) Inventors: Christian Bauer, Munich (DE); Michael Mueller, Munich (DE); Daniel Raasch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,778

(22) Filed: Dec. 28, 2018

(65) Prior Publication Data

US 2019/0135173 A1 May 9, 2019

Related U.S. Application Data

(63) Continuation of application No. PCT/EP2017/064467, filed on Jun. 14, 2017.

(30) Foreign Application Priority Data

Jun. 29, 2016 (DE) .................. 10 2016 211 737

(51) Int. Cl.
*B60Q 3/80* (2017.01)
*B60Q 9/00* (2006.01)
(Continued)

(52) U.S. Cl.
CPC ............. *B60Q 3/80* (2017.02); *B60Q 3/18* (2017.02); *B60Q 3/217* (2017.02); *B60Q 3/78* (2017.02); *B60Q 9/008* (2013.01)

(58) Field of Classification Search
CPC ... B60Q 3/80; B60Q 3/18; B60Q 3/74; B60Q 3/62; B60Q 3/217; H05B 37/02;
(Continued)

(56) References Cited

U.S. PATENT DOCUMENTS 5,436,808 A 7/1995 Noponen
6,754,565 B2 * 6/2004 Horbelt ............... B60R 16/0315
219/203

(Continued)

FOREIGN PATENT DOCUMENTS

DE 692 01 866 T2 12/1995
DE 100 37 131 A1 2/2002
(Continued)

OTHER PUBLICATIONS

International Search Report (PCT/ISA/210) issued in PCT Application No. PCT/EP2017/064467 dated Sep. 7, 2017 with English translation (six (6) pages).
(Continued)

*Primary Examiner* — Haissa Philogene
(74) *Attorney, Agent, or Firm* — Crowell & Moring LLP

(57) ABSTRACT

A motor vehicle has a central light control unit, a plurality of peripheral light control units distributed within the vehicle, and a plurality of interior light modules, each of which has a plurality of light sources and is associated with a peripheral light control unit. As a result of the receipt of a specified light effect identification by the peripheral light control units, a moving light is produced by the interior light modules associated with the peripheral light control units.

11 Claims, 2 Drawing Sheets

(51) Int. Cl.
   *B60Q 3/18* (2017.01)
   *B60Q 3/78* (2017.01)
   *B60Q 3/217* (2017.01)

(58) Field of Classification Search
   CPC .............. H05B 37/029; H05B 37/0254; H05B 33/0842; H05B 33/086; H05B 45/00; H05B 45/20; H05B 47/18; Y02B 20/48
   See application file for complete search history.

(56) References Cited

U.S. PATENT DOCUMENTS

| | | | | |
|---|---|---|---|---|
| 7,156,542 | B2* | 1/2007 | Miller | B60Q 1/085 |
| | | | | 362/466 |
| 8,880,199 | B2* | 11/2014 | Wei | H05B 33/0842 |
| | | | | 307/66 |
| 8,924,087 | B2* | 12/2014 | Heberer | E05B 77/02 |
| | | | | 340/5.72 |
| 9,955,551 | B2* | 4/2018 | Spero | B60Q 1/04 |
| 10,195,987 | B2* | 2/2019 | Berlitz | B60Q 3/54 |
| 10,322,670 | B2* | 6/2019 | Mueller | B60Q 3/80 |
| 2005/0063194 | A1 | 3/2005 | Lys et al. | |
| 2011/0305031 | A1 | 12/2011 | Riedel et al. | |
| 2015/0198319 | A1 | 7/2015 | Salter et al. | |

FOREIGN PATENT DOCUMENTS

| | | |
|---|---|---|
| DE | 10 2005 029 993 A1 | 1/2007 |
| DE | 10 2008 064 022 A1 | 9/2009 |
| DE | 10 2009 010 553 A1 | 9/2010 |
| DE | 10 2013 015 343 A1 | 3/2015 |
| DE | 10 2013 225 852 A1 | 6/2015 |
| DE | 10 2014 010 909 A1 | 1/2016 |
| DE | 10 2015 008 233 A1 | 2/2016 |
| DE | 11 2014 002 804 T5 | 3/2016 |
| JP | 2007-276671 A | 10/2007 |
| WO | WO 2009/011898 A2 | 1/2009 |
| WO | WO 2017/071972 A1 | 5/2017 |

OTHER PUBLICATIONS

German-language Written Opinion (PCT/ISA/237) issued in PCT Application No. PCT/EP2017/064467 dated Sep. 7, 2017 (six (6) pages).

German-language Search Report issued in counterpart German Application No. 102016211737.8 dated Apr. 21, 2017 with partial English translation (12 pages).

* cited by examiner

MOTOR VEHICLE

CROSS REFERENCE TO RELATED APPLICATIONS

This application is a continuation of PCT International Application No. PCT/EP2017/064467, filed Jun. 14, 2017, which claims priority under 35 U.S.C. § 119 from German Patent Application No. 10 2016 211 737.8, filed Jun. 29, 2016, the entire disclosures of which are herein expressly incorporated by reference.

BACKGROUND AND SUMMARY OF THE INVENTION

The invention relates to a motor vehicle comprising a plurality of interior light modules.

Modern motor vehicles increasingly have so-called ambient light functions in the interior, said ambient light functions providing for a discreet or conspicuous illumination of the interior depending on vehicle type or target group. The use of this kind of light facilitates orientation for the passengers in the vehicle and creates an individual and pleasant atmosphere. In this case, the control and definition of the light functions are generally realized by a central control unit.

The invention is based on the object of providing an improved motor vehicle.

A motor vehicle according to the invention comprises a central light control unit and a plurality of peripheral light control units distributed in the motor vehicle. Moreover, a plurality of interior light modules are provided, each of which comprises a plurality of light sources and is respectively assigned to a peripheral light control unit, in particular coupled thereto in a data-technological manner.

The central light control unit and the peripheral light control units are coupled to one another via a data bus.

The central light control unit is configured to transmit light effect identifiers to peripheral light control units for the purpose of initiating motor vehicle interior light effects. For initiating a predefined motor vehicle interior light effect, by way of example, identical or different predefined light effect identifiers can be sent to different peripheral light control units.

In reaction to the reception of the identical or different predefined light effect identifiers by the peripheral light control units, the interior light modules assigned to the peripheral light control units generate a moving light that is determined by the predefined light effect identifiers. Preferably, in reaction to the reception of the identical or different predefined light effect identifiers by the peripheral light control units, the interior light modules assigned to the peripheral light control units are driven by the peripheral light control units in such a way that a moving light is generated, which is determined by the predefined light effect identifiers.

Particularly preferably, provision is made in this case for the distance between a, or each, peripheral light control unit and the central light control unit to be three times, five times, ten times or twenty times the magnitude of the distance between the peripheral light control unit and the assigned interior light module.

Peripheral light control units can be arranged for example at the door inner sides, in the door interior, at the motor vehicle headliner, in a manner concealed by the motor vehicle headliner, at or in the motor vehicle A-pillar, at or in the motor vehicle B-pillar, at or in the motor vehicle C-pillar, at the glove compartment, around operating elements, around a display and/or on an instrument panel, or be part of these components.

An interior light module comprises for example a plurality of, in particular different-colored, LEDs and/or a plurality of RGB LEDs. Preferably, an interior light module is in each case coupled to a peripheral light control unit in a data-technological manner and, if appropriate, also in an energy-technological manner. Particularly preferably, provision is made for an interior light module to comprise a plurality of light sources or light source groups which are arranged alongside one another and which are able to be switched on or are activatable in a manner temporally offset with respect to one another and preferably correspondingly are able to be switched off or are deactivatable in a manner temporally offset with respect to one another, with the result that an observer is given the impression of a moving light in which, for example relative to a light module in an observer's perception, the location of maximum optical radiation power is arbitrarily moved discretely or continuously in the direction of the maximum longitudinal extent of the light module. Preferably, for this purpose, the light sources of an interior light module are sequentially and cyclically activatable and/or deactivatable. The temporally offset activation of light sources arranged alongside one another can also be carried out in a temporally overlapping manner.

A moving light identifier can explicitly or implicitly define the following parameters, for example: switch-on and switch-off time for the moving light, moving direction, moving duration, switch-on delay duration, light source beginning with moving light, light source ending moving light, luminous intensity and/or moving light speed. Depending on the embodiment variant, a moving light identifier can explicitly contain more or fewer moving light parameters.

In accordance with one preferred embodiment of the invention, it is provided that the peripheral light control units are based on the same timebase, that the peripheral light control units in particular share a common timebase and/or the peripheral light control units are synchronized with one another.

In accordance with one preferred embodiment, the peripheral light control units each comprise a data memory in which is stored a respective light effect parameter set assigned to the light effect identifiers. In reaction to the reception of a light effect identifier from the central light control unit by a peripheral light control unit, the light effect parameter set assigned to said light effect identifier is preferably used by the peripheral light control unit to drive the associated light module and the light sources contained therein such that the desired motor vehicle interior light effect, in particular the desired moving light, is generated. As a result, arbitrary moving lights can be provided in a simple manner.

By dividing the control function between a central light control unit and a plurality of peripheral light control units and preferably storing light effect parameter sets in the peripheral light control units in a decentralized manner, what is made possible is that complex motor vehicle interior light effects, such as a moving light concerning extensive parts of the motor vehicle interior, can be realized without overloading or without excessively loading the data bus technologies typically used in motor vehicles, and without dispensing with the central control. Instead of transmitting a plurality of extensive light effect parameter sets, for this purpose it is necessary merely to transmit identical or different predefined light effect identifiers, for example a moving light identifier, from the central light control unit to the peripheral light control units.

In accordance with one preferred embodiment, a light effect parameter set comprises for example control information for at least one interior light module, which control information defines for example which light source or which light sources of the interior light module is or are activated, i.e. caused to emit light, and when, until when, for how long, with what color, with what intensity and/or with what intensity profile.

Preferably, the central light control unit is configured in such a way that different or identical light effect identifiers are transmitted to different peripheral light control units for the purpose of initiating a motor vehicle interior light effect. In different peripheral light control units, different or identical light effect parameter sets can be assigned to identical light effect identifiers.

In one development of the invention, a first interior light module and/or an assigned first peripheral light control unit are/is arranged in a driver's door of the motor vehicle, a second interior light module and/or an assigned second peripheral light control unit are/is arranged in, below or at an instrument panel of the motor vehicle, and a third interior light module and an assigned third peripheral light control unit are arranged in a passenger door of the motor vehicle.

Preferably, the moving light is generated by means of at least the first, second and third interior light modules. What is achieved as a result is that a moving light is generated which relates to a large part of the motor vehicle interior, or which concerns a large part of the motor vehicle interior, and which is initiated centrally. In this case, the moving light can be constructed from individual moving lights respectively generated by the individual interior light modules, wherein the driving of the individual interior light modules can be coordinated with one another, thus resulting overall in a moving light passing in each case beyond the individual interior light modules.

In one development of the invention, provision is made of a hazard identification device for outputting a hazard signal in reaction to the identification of a hazard, wherein the hazard identification device is coupled to the central light control unit in such a way, and the central light control unit is configured in such a way, that in reaction to a hazard signal that has been output, the central light control unit transmits predefined light effect identifiers (different or identical), in particular for initiating a moving light, to the peripheral light control units.

As a result, with a conspicuous moving light, a driver of the motor vehicle can be made aware of a possible collision hazard, for example.

The hazard identification device can be a computer-aided camera system and/or a motor vehicle assistance system known per se, by means of which a hazard signal is output for example when an obstacle or a possible collision object is identified.

Preferably, in the central light control unit, different light effect identifiers or groups of light effect identifiers are assigned to different hazard signals, and the central light control unit is configured in such a way that at least one light effect identifier or groups of light effect identifiers is or are transmitted to peripheral light control units automatically, depending on a received hazard signal. For this purpose, information about assignments of light effect identifiers to hazard signals is stored in the central light control unit, for example in a data memory.

As a result, complex light effects, in particular moving lights, concerning the entire motor vehicle interior can be implemented in practice in a simple manner depending on current hazard signals.

In one development of the invention, the hazard signal contains location information (location of a hazard source relative to the vehicle, direction to a hazard source proceeding from the vehicle), which preferably determines or describes the location of the hazard relative to the motor vehicle, and the moving light is implemented in reaction to the location information, in particular in such a way that the location of the hazard is indicated by the moving light.

What is achieved as a result is that the moving light not only conspicuously indicates to a driver a possible hazard, but even additionally indicates the location of the hazard source.

In one development of the invention, the moving light is implemented in reaction to the location information in such a way that the moving light generated by the individual light modules moves toward the location of the hazard source, at least moves toward the location of the hazard source rather than moves away from the location of the hazard source.

Preferably, the interior light modules involved generate two moving lights that move toward one another, wherein the location at which the two moving lights move toward one another is the location of the interior light modules which is closest to the hazard source, or which substantially forms the intersection point of a straight line from the driver to the hazard source with the interior light modules.

In one development of the invention, in reaction to the reception of the predefined light effect identifiers by the peripheral light control units, the interior light modules assigned to the peripheral light control units firstly generate an attention light and then generate a moving light, which are determined by the light effect identifiers.

In this case, the attention light is preferably generated by one of the interior light module(s) generating light in a predefined uniform light color, wherein preferably the radiation power generated by the interior light module(s) is higher than the radiation power generated by the interior light module(s) during a moving light.

As a result, an even more conspicuous prior signal draws a driver's attention to the subsequent conspicuous moving light.

In one development of the invention, in reaction to the reception of the at least one predefined light effect identifier by the peripheral light control units, the interior light modules assigned to the peripheral light control units firstly generate an attention light, then dim the interior light module(s) and then generate a moving light.

Preferably, provision is made for at least one interior light module to be optically coupled to an optical waveguide or a diffusing screen, in particular for optically influencing the light generated by the interior light module.

These developments increase the diversity of possible interior light effects in a simple manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
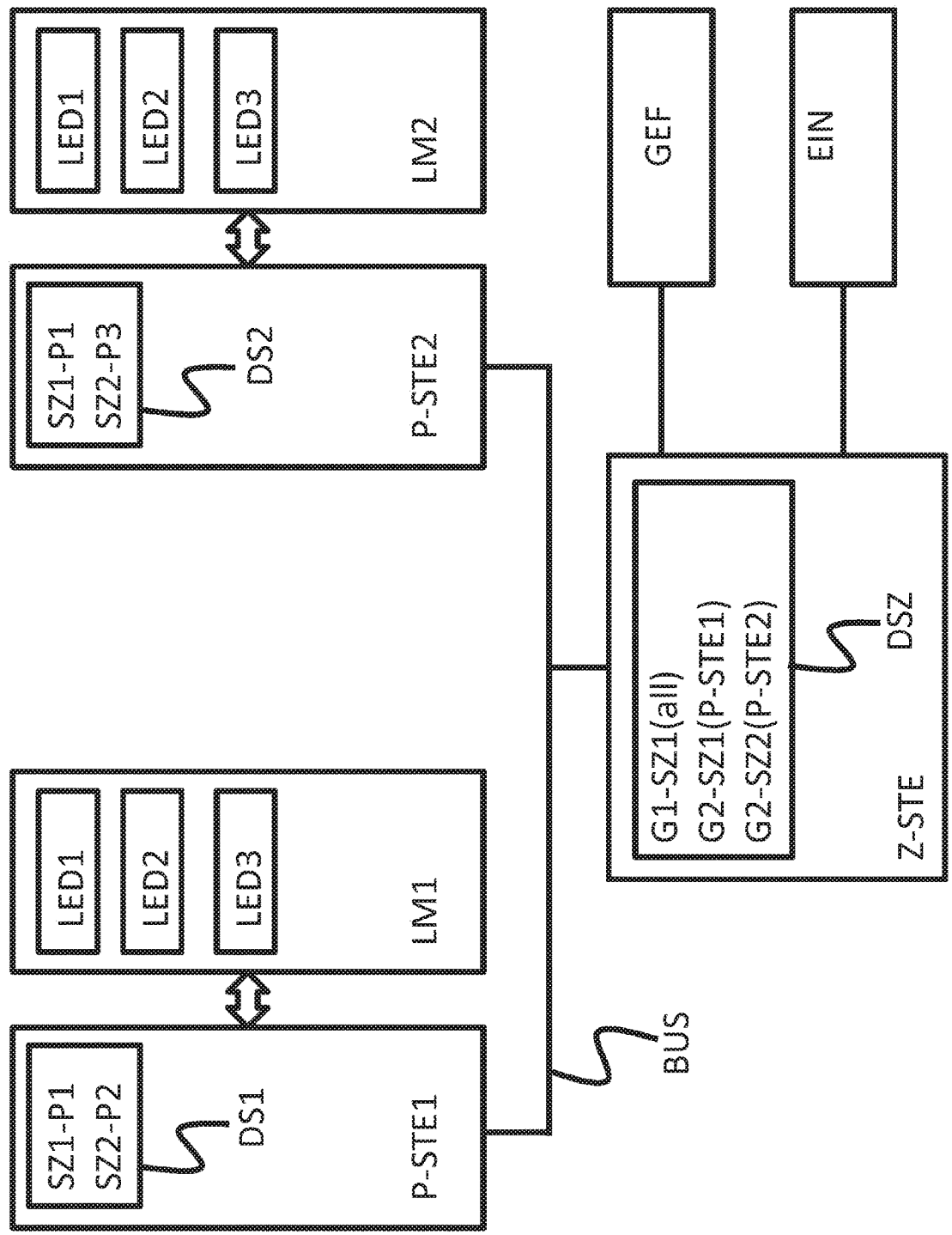
FIG. 1 is a simplified schematic basic illustration of interior lighting of a motor vehicle from above.

The interior lighting of a motor vehicle from FIG. 1 discloses a central light control unit Z-STE known per se in terms of hardware technology, and two peripheral light control units P-STE1, P-STE2, which are distributed in the motor vehicle and which can likewise be constructed in a manner known per se from the standpoint of hardware technology.

In addition, two interior light modules LM1, LM2 are provided, each of which comprises a plurality of LED-based light sources LED1, LED2, LED3 and is respectively assigned to a peripheral light control unit P-STE1, P-STE2 and coupled thereto in a data-technological manner. The LED-based light sources LED1, LED2, LED3 can comprise a plurality of individual, different-colored LEDs and/or a plurality of RGB LEDs.

The interior light modules LM1, LM2 are inserted for example into the inner lining of the left or right driver's door. In this case, the light from the light sources LED1, LED2, LED3 is coupled into an optical waveguide (not illustrated), guided through the optical waveguide and coupled out again at desired regions. As an alternative thereto, the light from the light sources LED1, LED2, LED3 arranged alongside one another radiates through a diffusing screen or a component similar to a diffusing screen.

By means of a motor vehicle data bus BUS known per se, such as a LIN bus, for example, the central light control unit Z-STE and the peripheral light control units P-STE1, P-STE2 are connected to one another in a data-technological manner.

The peripheral light control units P-STE1, P-STE2 respectively comprise a data memory DS1, DS2, in which are stored light effect parameter sets P1, P2, P3 to which a respective light effect identifier SZ1, SZ2 is assigned. A typical light effect parameter set P1, P2, P3 contains for example information about light color, luminous duration, light intensity, delay time, activation instant, deactivation instant and/or light intensity profile in each case for the individual light sources LED1, LED2, LED3 of at least one interior light module LM1, LM2.

The central light control unit Z-STE is configured, then, in particular in terms of programming, in such a way that depending on a hazard signal G1, G2 currently present, in particular detected, light effect identifiers SZ1, SZ2 are transmitted to the peripheral light control units P-STE1, P-STE2 via the motor vehicle data bus BUS, on the basis of transmission and addressing methods known per se.

The hazard signal G1, G2 is output by a hazard identification device GEF known per se in reaction to the identification of a hazard, wherein the hazard identification device GEF is coupled to the central light control unit Z-STE in such a way, and the central light control unit Z-STE is configured in a way, that in reaction to a hazard signal G1, G2 that has been output, the central light control unit Z-STE transmits the assigned predefined light effect identifier(s), in particular for the purpose of initiating a moving light, to the peripheral light control units.

The hazard identification device GEF can be a computer-aided camera system and/or a sensor-aided or camera-aided motor vehicle assistance system known per se, by means of which a hazard signal is output for example when an obstacle or a possible collision object is identified.

In the central light control unit Z-STE, different light effect identifiers SZ1, SZ2 or groups of light effect identifiers are assigned to different hazard signals G1, G2, with the result that a light effect identifier or groups of light effect identifiers is or are transmitted to peripheral light control units automatically, depending on a received hazard signal G1, G2. For this purpose, information about assignments of light effect identifiers SZ1, SZ2 to hazard signals G1, G2 is stored in the central light control unit Z-STE, for example in a data memory.

After the reception of the light effect identifiers SZ1, SZ2 respectively addressed to the peripheral light control units P-STE1, P-STE2, said peripheral light control units P-STE1, P-STE2 map said light effect identifiers SZ1, SZ2 respectively onto the associated light effect parameter sets P1, P2. These associated parameter sets P1, P2 are then used by the peripheral light control unit P-STE1, P-STE2 for driving the relevant light sources LED1, LED2, LED3 of the relevant interior light module LM1, LM2 in such a way that the individual light sources LED1, LED2, LED3 are driven for generating light in accordance with the information described in the light effect parameter sets P1, P2, P3. For this purpose, the peripheral light control units P-STE1, P-STE2 can for example also comprise pulse width modulation drivers known per se.

For reasons of simplification, the energy-technological supply (powering), known per se, of the individual components of the interior lighting will not be discussed in more specific detail.

An assignment of hazard signals G1, G2 to light effect identifiers SZ1, SZ2 and of light effect identifiers SZ1, SZ2 to light effect parameter sets P1, P2 and the application thereof are explained below on the basis of an example.

In a data memory DSZ of the central light control unit Z-STE, different light effect identifiers SZ1, SZ2 are assigned to different hazard signals G1, G2:

G1-SZ1,
G2-SZ1,
G2-SZ2.

In this case, these assignments apply for example to all peripheral light control units (G1-SZ1 (all)) or only to specific peripheral light control units (G1-SZ1(P-STE1); G1-SZ2(P-STE2)).

If a hazard signal G1 is identified, for example, then the light effect identifier SZ1 is communicated to all peripheral light control units.

By contrast, if a hazard signal G2 is identified, for example, then the light effect identifier SZ1 is communicated, in particular addressed, to a first peripheral light control unit P-STE1 and the light effect identifier SZ2 is communicated to a second peripheral light control unit P-STE2.

The reception and the processing of a first light effect identifier SZ1 brings about, in the first peripheral light control unit P-STE1 or respectively in the second peripheral light control unit P-STE2, a driving of the light module LM1 or respectively of the light module LM2 in accordance with the light effect parameter set P1 (SZ1-P1).

By contrast, the reception and the processing of a second light effect identifier SZ2 brings about, in the first peripheral light control unit P-STE1, a driving of the first light module LM1 in accordance with the light effect parameter set P2 (SZ2-P2) and, in the second peripheral light control unit P-STE2, a driving of the second light module LM2 in accordance with the light effect parameter set P3 (SZ2-P3).

As a result, complex static and/or dynamic light effects concerning the entire motor vehicle interior can be realized with a simple, proven data bus known per se.

Figure 2:
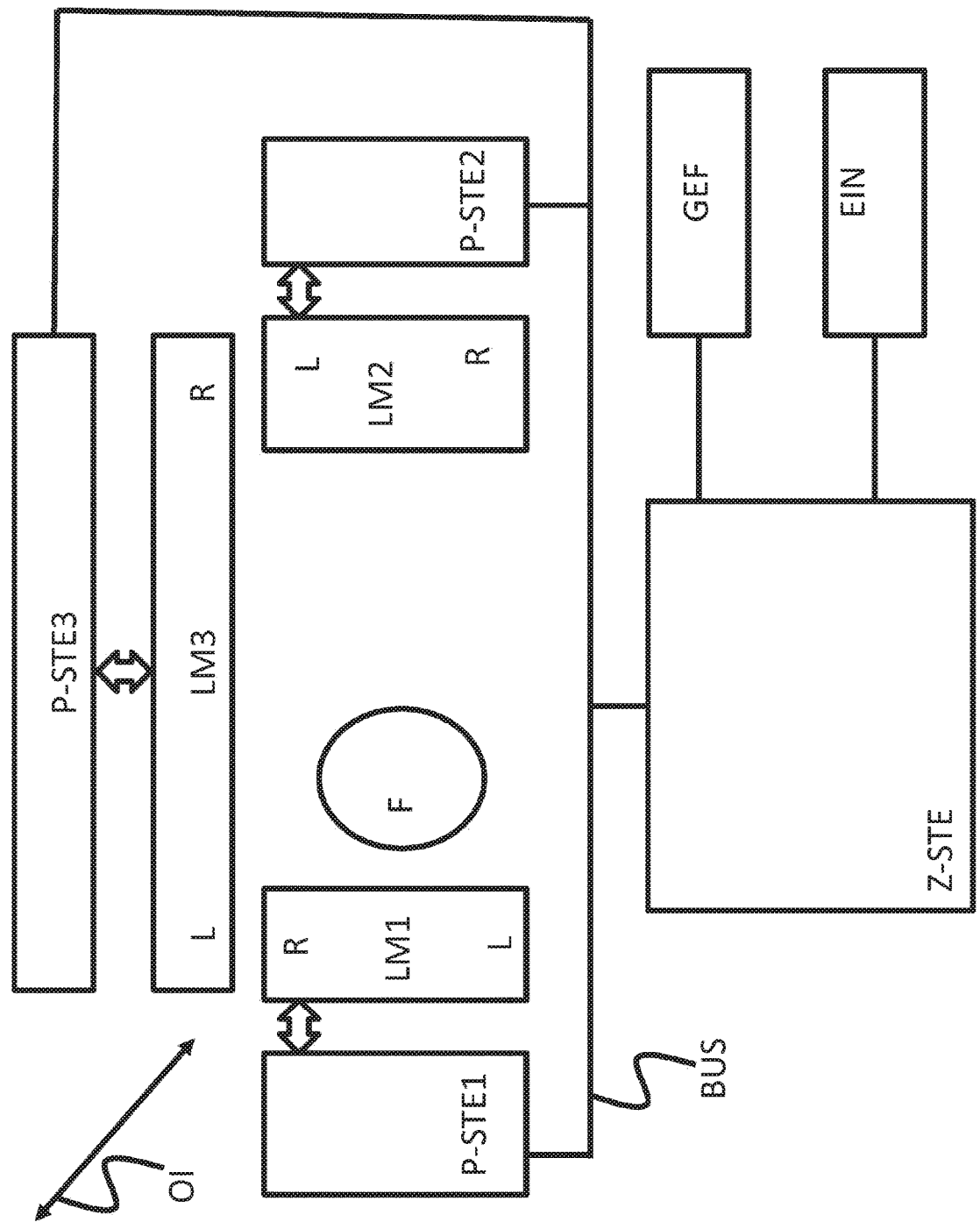
FIG. 2 is a simplified schematic basic illustration of interior lighting of a motor vehicle for generating a moving light from above.

The generation of a moving light is described below with reference to FIG. 2. It is assumed here that, in the lining of the left front door, a first interior light module LM1 is arranged visibly and a first peripheral light control unit P-STE1 is arranged in the manner concealed by the lining.

A second interior light module LM2 is inserted into the instrument panel visibly and a second peripheral light control unit P-STE2 is accommodated in a manner concealed by the instrument panel.

In the lining of the right front door, a third interior light module LM3 is arranged visibly and a third peripheral light control unit P-STE3 is arranged in the manner concealed by the lining.

The interior light modules LM1, LM2, LM3 are each embodied as moving light modules in which light sources arranged alongside one another in each case are activated and/or deactivated temporally successively, preferably cyclically, with the result that an observer is given the impression of a moving light. As an alternative thereto, a moving light can also be generated with an optical waveguide bundle in which light pulses are successively coupled into the optical waveguides and the optical waveguides have coupling-out sections spatially offset with respect to one another.

Then, for example in a manner initiated by the reception of a specific hazard signal, the associated light effect identifier (moving light light effect identifier) is sent to the three peripheral light control units P-STE1, P-STE2, P-STE3.

The light effect parameter set assigned to this moving light light effect identifier brings about, in the first peripheral light control unit P-STE1, the initiation of a moving light in the first light module LM1 from left to right with a start delay of 0 ms and a total light propagation time of 500 ms (the light sources of the first light module LM1 generate a moving light for 500 ms, i.e. the light sources of the light module, for 500 ms, in accordance with their spatial order, are successively activated in a temporally offset manner and if appropriate deactivated again (preferably only one cycle)). By way of example, a first LED of a total of five LEDs is activated for the first 100 ms, then deactivated, the second (neighboring) LED is activated for the second 100 ms, then deactivated, etc.

The light effect parameter set assigned to the moving light light effect identifier in the third peripheral light control unit P-STE3 brings about, in the second peripheral light control unit, the initiation of a moving light in the third light module LM3 from left to right with a start delay of 500 ms and a total light propagation time of 800 ms (the light sources of the third light module LM3 generate a moving light for 800 ms).

The light effect parameter set assigned to the moving light light effect identifier in the second peripheral light control unit P-STE2 brings about, in the third peripheral light control unit, the initiation of a moving light in the second light module LM2 from left to right with a start delay of 1300 ms and a total light propagation time of 500 ms (the light sources of the second light module LM2 generate a moving light for 500 ms).

In an alternative embodiment variant, the hazard signal G1 contains location information (symbolized here by the double-headed arrow OI), which indicates the direction from which the hazard source is coming or the direction in which the hazard source is visible. Once again an associated light effect identifier SZ1 (in this exemplary embodiment a moving light light effect identifier with location information) is sent to the three peripheral light control units P-STE1, P-STE2, P-STE3.

The light effect parameter set assigned to this moving light light effect identifier with location information SZ1 brings about, in the first peripheral light control unit P-STE1, the initiation of a moving light in the first light module LM1 from left L to right R (from the point of view of the driver F) with a start delay of 500 ms and a total light propagation time of 500 ms (the light sources of the first light module LM1 generate a moving light for 500 ms after a delay of 500 ms, i.e. the light sources of the light module, for 500 ms, in accordance with their spatial order, are successively activated in a temporally offset manner and if appropriate deactivated again (preferably only one cycle)).

The light effect parameter set assigned to the moving light light effect identifier in the second peripheral light control unit P-STE2 brings about, in the second peripheral light control unit, the initiation of a moving light in the second light module LM2 from right R to left L with a start delay of 0 ms and a total light propagation time of 500 ms (the light sources of the second light module LM2 generate a moving light for 500 ms).

The light effect parameter set assigned to the moving light light effect identifier in the third peripheral light control unit P-STE3 brings about, in the third peripheral light control unit, the initiation of a moving light in the third light module LM3 from right R to left L with a start delay of 500 ms and a total light propagation time of 500 ms (the light sources of the third light module LM3 generate a moving light for 500 ms). As a result, a total of two moving lights are generated, a first by the first light module LM1 and a second by the second and third light modules LM2, LM3, which move toward one another at a place which indicates to a driver F the location of the hazard source.

A further embodiment provides for an attention flash to be generated by the light modules LM1, LM2, LM3 in a manner initiated by the hazard signal G1 and the associated light effect identifier before the generation of the moving light. In this case, firstly all LEDs of all light modules LM1, LM2, LM3 are activated simultaneously, preferably with maximum brightness, for 20 ms and then deactivated again. It is only after a pause of 10 ms that the moving light described several times above is generated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a central light control unit;
   a plurality of peripheral light control units distributed in the motor vehicle;
   a plurality of interior light modules, each of which comprises a plurality of light sources and is respectively assigned to a peripheral light control unit;
   a data bus, via which the central light control unit and the peripheral light control units are coupled to one another, wherein
   the central light control unit is configured to transmit light effect identifiers to peripheral light control units for the purpose of initiating motor vehicle interior light effects, and in reaction to receiving the light effect identifiers by the peripheral light control units, the interior light modules assigned to the peripheral light control units generate a moving light that is determined by the light effect identifiers.

2. The motor vehicle as claimed in claim 1, wherein
a first interior light module is arranged in a driver's door of the motor vehicle,
a second interior light module is arranged in, below, or at an instrument panel of the motor vehicle, and
a third interior light module is arranged in a passenger door of the motor vehicle.

3. The motor vehicle as claimed in claim 2, wherein
a first peripheral light control unit assigned to the first interior light module is arranged in the driver's door of the motor vehicle,
a second peripheral light control unit assigned to the second interior light module is arranged in, below, or at the instrument panel of the motor vehicle, and
a third peripheral light control unit assigned to the third interior light module is arranged in the passenger door of the motor vehicle.

4. The motor vehicle as claimed in claim 1, further comprising:
a hazard identification device for outputting a hazard signal in reaction to identifying a hazard, wherein
the hazard identification device is coupled to the central light control unit in such a way, and the central light control unit is configured in such a way, that in reaction to the hazard signal that has been output, the central light control unit transmits light effect identifiers for initiating a moving light, to the peripheral light control units.

5. The motor vehicle as claimed in claim 4, wherein
the hazard signal contains location information, and
the moving light is implemented in reaction to the location information.

6. The motor vehicle as claimed in claim 5, wherein
the moving light is implemented in reaction to the location information in such a way that the moving light generated by the individual light modules moves toward the location of the hazard source.

7. The motor vehicle as claimed in claim 1, wherein
in reaction to receiving light effect identifiers by the peripheral light control units, the interior light modules assigned to the peripheral light control units firstly generate an attention light and then generate a moving light, which are determined by the light effect identifiers.

8. The motor vehicle as claimed in claim 7, wherein
the attention light is generated by one or more of the interior light modules generating light in a predefined uniform light color.

9. The motor vehicle as claimed in claim 8, wherein
radiation power generated by the interior light modules generating the light in the predefined uniform light color is higher than radiation power generated by the interior light modules during a moving light.

10. The motor vehicle as claimed in claim 1, wherein
in reaction to receiving light effect identifiers by the peripheral light control units, the interior light modules assigned to the peripheral light control units firstly generate an attention light, then dim the interior light modules and subsequently generate a moving light.

11. A motor vehicle, comprising:
a central light control unit;
a plurality of peripheral light control units distributed in the motor vehicle;
a plurality of interior light modules, each of which comprises a plurality of light sources and is respectively assigned to a peripheral light control unit;
a data bus, via which the central light control unit and the peripheral light control units are coupled to one another, and
a hazard identification device for outputting a hazard signal in reaction to the identification of a hazard, wherein
the central light control unit is configured to transmit signals to peripheral light control units for the purpose of initiating motor vehicle interior light effects,
in reaction to receiving the signals by the peripheral light control units, the interior light modules assigned to the peripheral light control units generate a moving light,
each of the plurality of interior light modules comprises a plurality of light sources arranged next to one another,
the signals are light effect identifiers, wherein the moving light is determined by the light effect identifiers, and
the hazard identification device is coupled to the central light control unit in such a way, and the central light control unit is configured in such a way, that in reaction to a hazard signal that has been output, the central light control unit transmits light effect identifiers for initiating the moving light to the peripheral light control units.

* * * * *